UNITED STATES PATENT OFFICE.

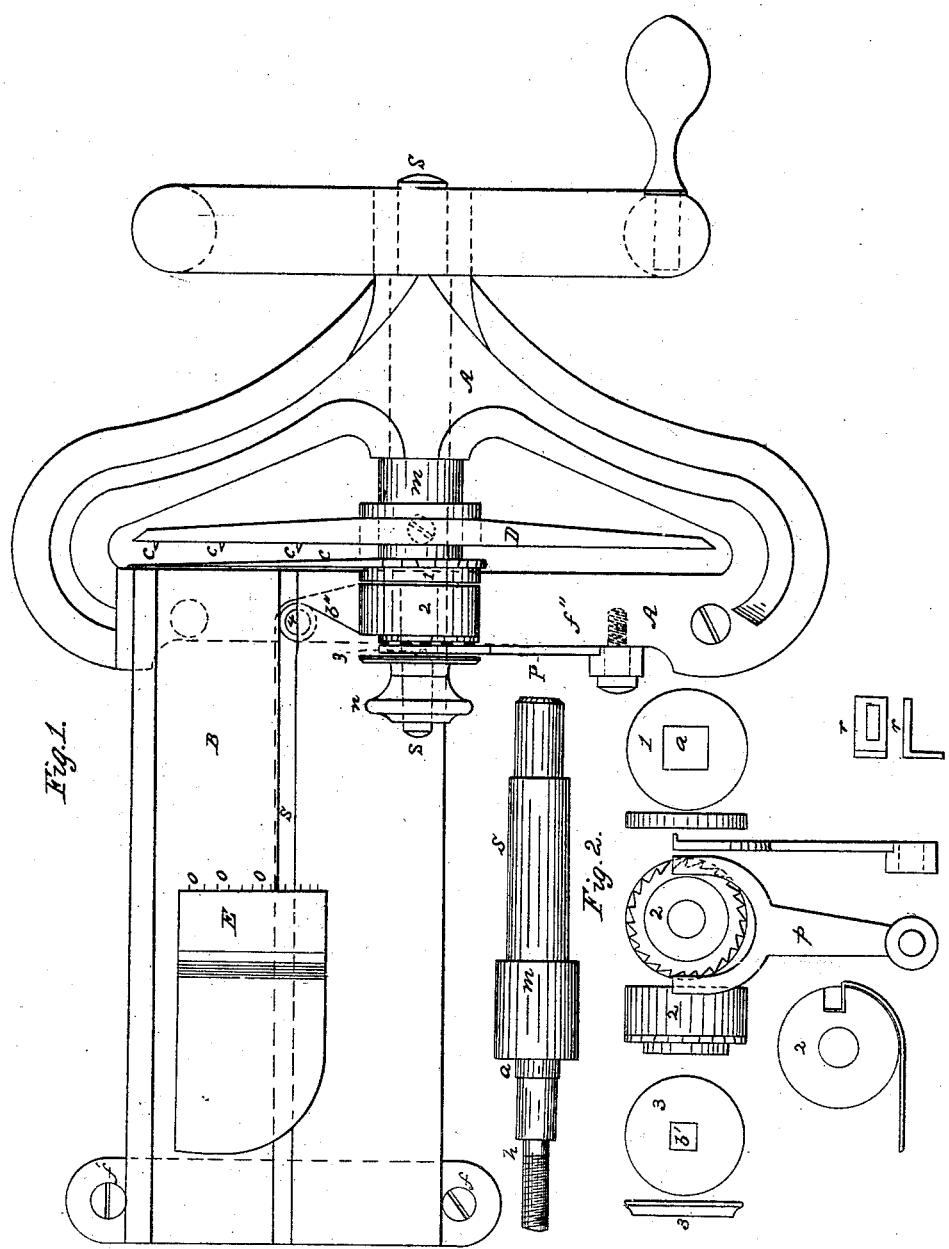

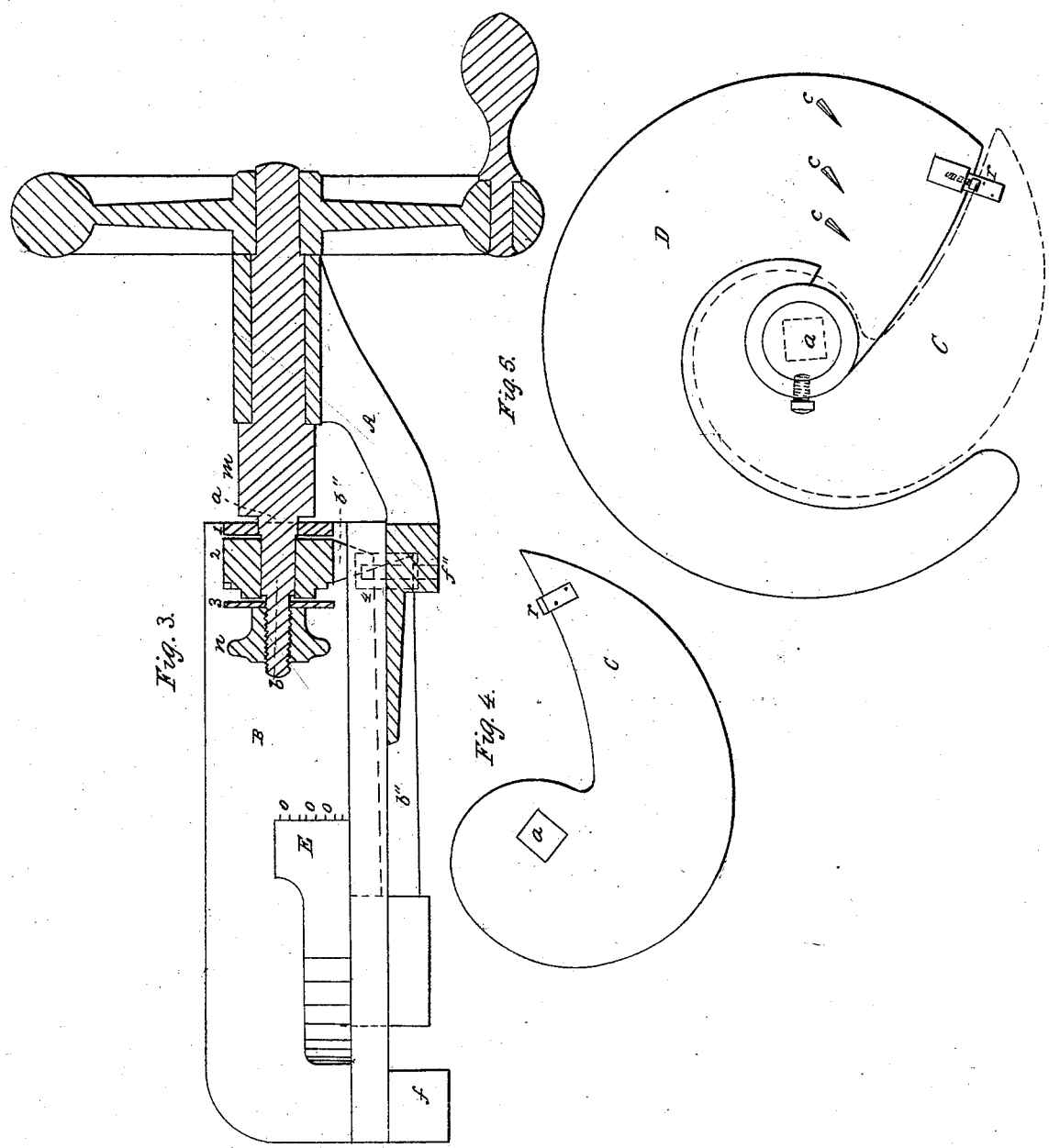

GEORGE B. PULLINGER, OF GERMANTOWN, PENNSYLVANIA.

IMPROVED MEAT AND VEGETABLE SLICER.

Specification forming part of Letters Patent No. 45,751, dated January 3, 1865.

*To all whom it may concern:*

Be it known that I, GEORGE B. PULLINGER, of Germantown, (twenty-second ward of the city of Philadelphia,) and State of Pennsylvania, have invented new and useful Improvements in Meat and Vegetable Slicers; and I do hereby declare that the following is a full and exact description thereof, reference being had to the accompanying drawings, and to the letters of reference marked thereon, in which—

Figure 1 is a top view. Fig. 2 is details. Fig. 3 is a transverse section through the center of the shaft. Fig. 4 is a view of the knife. Fig. 5 is a view of the adjustable rotating gage-plate.

Like letters of reference refer to like parts.

The nature of my invention consists in combining an adjustable rotating gage-plate with a rotating knife, also a frictional feed, for the purpose of slicing meat and vegetables. It may be used for other purposes, such as slicing or cutting hard soap and other articles.

In order that others may make and use my improved slicer, I will describe its construction.

A in Figs. 1 and 3 represents a cast-iron frame, which can be made of any suitable design.

B is the feed-box, which can be made of wood or iron. If made of iron, it should be galvanized or enameled. This box is constructed with a bottom and one side. In the bottom is a slot, $s$, running the full length. This box is fastened to the frame A by screws. The box B and the frame A may be cast in one piece, if desired. On the end of the box is a foot, $f$, to correspond with a foot on the frame A, (marked $f'$.) These feet are fastened to a table or some suitable place where the machine is kept for use.

S is the shaft, to which the knife, gage-plate, and friction feed-pulley are attached. This shaft is supported in the bearings or journal-boxes in the frame A, and receives motion from the handle in the balance-wheel, keyed onto the end of the shaft.

It will be seen in Fig. 4 that the knife has a square hole in it. This fits a square on the shaft S, (marked $a$, seen in details.) The washer 1 also fits this square. The pulley 2 has a round hole in it, which fits the round part of the shaft. The washer 3 has a square hole in it to fit the square on the shaft, (marked $b'$.) Between the washers and the pulley are leather washers. On the end of the shaft is a screw-thread with a milled nut, $n$. By this nut the frictional feed is regulated. Between the pulley 2 and the washer 3 is a ratchet-wheel, fastened to the pulley 2. The pawl-catch $p$ has a yoke on the catch end, which is fitted between the washer 3 and the pulley 2. The other end is fastened to the frame A by the screw-bolt seen in Fig. 1.

Fastened to the friction-pulley is a strap, $b''$, which passed around the pulley 2, (seen in the frame A by the dotted lines.) This strap is connected to the pressure-block or carriage E. To this block is fitted a tongue, which travels in the slot $s$. To this tongue is fastened the strap $b''$. The head of the block E is fitted with wire teeth $o\ o\ o$, so that it will hold onto the object being cut as it is carried forward to the knife.

The shape of the gage-plate will be seen in Fig. 5. It is fastened to the hub by one arm. A portion of the plate is removed to correspond to the shape of the knife. The plate is fastened to the shaft S by a set-screw, the point of which is screwed into a channel or groove cut into the shaft the length of the shaft-bearing for the hub of the gage-plate, as marked $m$ in Fig. 1. In the gage-plate are scoring-cutters, (marked $c\ c$,) set at convenient distances from each other, with the cutting-edges leaning toward the center of the shaft, which will throw the meat against the angle of the feed-box. They will cut just before the revolving knife. These knives can be removed when desired. At the outer point, and riveted to the knife, is an adjustable stay, which is made adjustable to the gage-plate by a screw and slot, which may be seen in details, Fig. 2, (marked $r$,) the object of said stay being to steady the knife during the process of cutting or slicing.

To operate the machine, the catch $p$ is raised and the carriage E is drawn back, the meat is placed in the feed-box, and the handle is turned in the direction of the arrow. The band on the friction-pulley will keep the meat against the gage-plate after each slice has been cut. The scoring knives or cutters will cut the slice in strips just previous to severing it from the bulk. As it is not desirable to have it in one slice, the thickness can be regulated by shifting the gage-plate on the shaft, and the slotted stay $r$ on the knife. The object of the catch $p$ and the ratchet on the pulley 2 is to prevent any accident in case the machine is turned backward.

The machines can be made of any size desired, and operated by steam or other power, and can be used in hospitals, hotels, and on shipboard, for slicing bread and meat, and for other purposes.

Having thus described my slicer, I claim—

1. The adjustable rotating gage-plate D, as described, and for the above purpose.

2. The scoring-knives $c\ c\ c$, in combination with the rotating gage-plate D, as described, and for the above purpose.

3. The slotted stay $r$, for securely holding the end of the cutter G, as above described, and for the purpose specified.

4. The frictional feed-motion, as constructed and operated, as described, for the above purpose.

GEORGE B. PULLINGER.

Witnesses:
WM. P. HIBBIRD,
JOHN SHINN.